United States Patent
Higashino et al.

(10) Patent No.: US 6,294,615 B1
(45) Date of Patent: *Sep. 25, 2001

(54) COPOLYMER, CATIONIC HIGH MOLECULAR WEIGHT FLOCCULATING AGENT COMPRISING THE COPOLYMER, AND PROCESS FOR PRODUCING THE COPOLYMER

(75) Inventors: Toshiya Higashino, Aichi; Hiroshi Inoue, Mie, both of (JP)

(73) Assignee: Tosch Corporation, Yamaguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,974

(22) Filed: Dec. 8, 1998

(30) Foreign Application Priority Data

Dec. 8, 1997 (JP) ............................ 9-336988
Oct. 21, 1998 (JP) ............................ 10-300160

(51) Int. Cl.$^7$ ............................ C08F 8/48; C08F 226/06; C08F 11/14
(52) U.S. Cl. ............................ 525/326.9; 525/329.2; 525/378; 525/382; 526/258; 526/260; 526/264; 526/265
(58) Field of Search ............................ 525/326.9, 329.2, 525/382, 378; 526/258, 260, 264, 265

(56) References Cited

U.S. PATENT DOCUMENTS

| | | | |
|---|---|---|---|
| 3,288,707 | * 11/1966 | Hurwitz et al. | 525/378 |
| 4,109,072 | * 8/1978 | Panzer et al. | 526/258 |
| 4,113,934 | * 9/1978 | Panzer et al. | 526/258 |
| 4,595,731 | * 6/1986 | Wilkinson | 525/329.1 |

FOREIGN PATENT DOCUMENTS

| | | | | |
|---|---|---|---|---|
| 42-6271 | 3/1942 | (JP) | . | |
| 42-9653 | 5/1942 | (JP) | . | |
| 58-96604 | 6/1983 | (JP) | ............ | C08F/8/32 |
| 61-83205 | 4/1986 | (JP) | ............ | C08F/8/48 |
| 61-83206 | 4/1986 | (JP) | ............ | C08F/8/48 |
| 61-83207 | 4/1986 | (JP) | ............ | C08F/8/48 |
| 61-285202 | 12/1986 | (JP) | ............ | C08F/8/48 |
| 62-34905 | 2/1997 | (JP) | ............ | C08F/8/32 |

* cited by examiner

*Primary Examiner*—Donald R. Wilson
(74) *Attorney, Agent, or Firm*—Sughrue, Mion, Zinn, Macpeak & Seas, PLLC

(57) ABSTRACT

A copolymer which can provide an aqueous solution thereof having high viscosity, a cationic high molecular weight flocculating agent comprising the copolymer and a process for producing the copolymer. The copolymer is formed by a process where copolymer units necessary to form the copolymer are reacted with a polyamine in the presence of ammonium chloride and/or a hydrochloride of an amine. The copolymer has units represented by the following formulae (1) and (2) where substituents are defined in the specification:

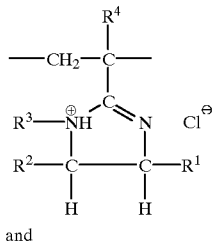

(1)

and

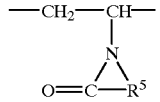

(2)

The copolymer has a Brookfield viscosity as a 1 wt % aqueous solution thereof of 10 to 10,000 centipoise.

11 Claims, 1 Drawing Sheet

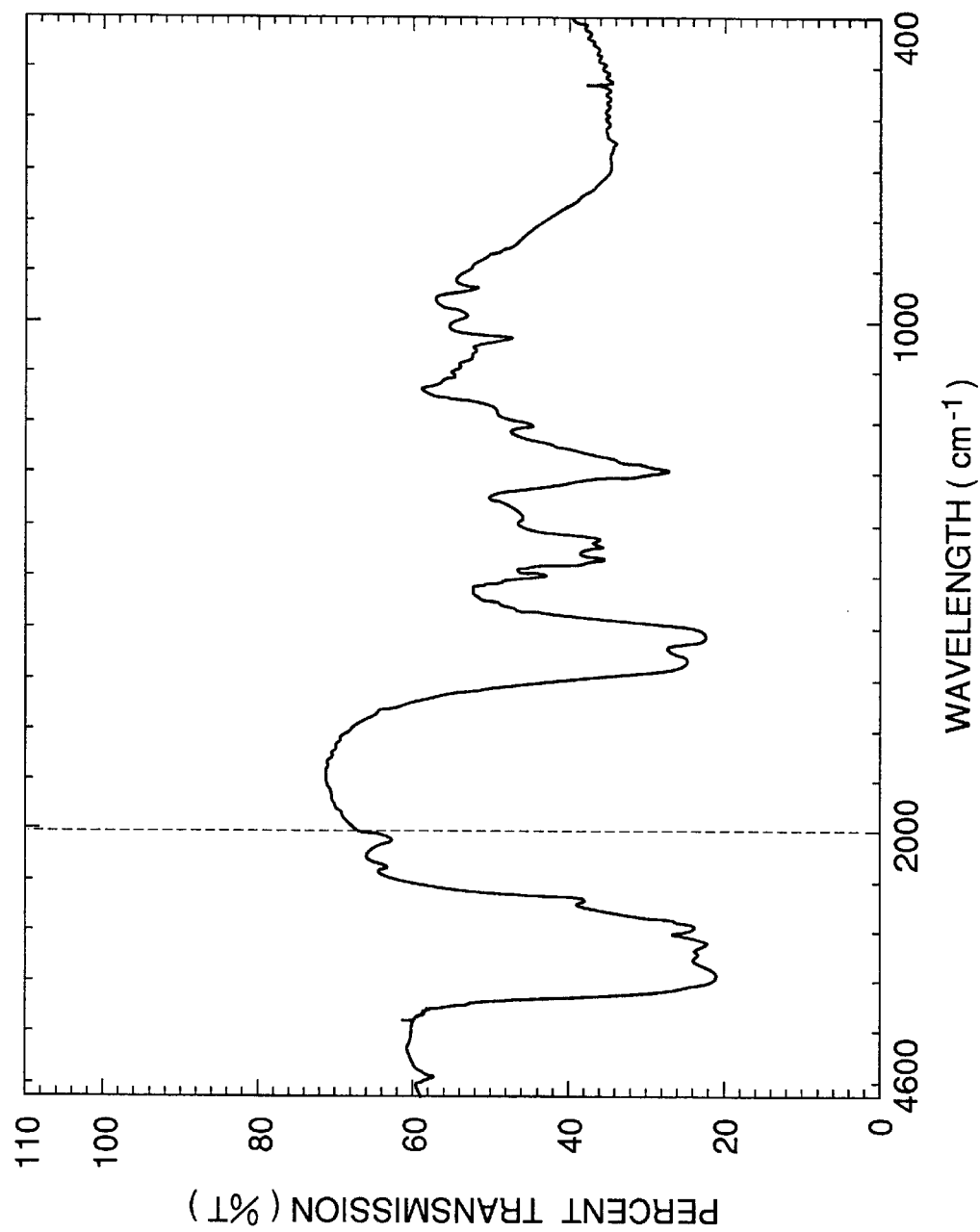
FIGURE

COPOLYMER, CATIONIC HIGH MOLECULAR WEIGHT FLOCCULATING AGENT COMPRISING THE COPOLYMER, AND PROCESS FOR PRODUCING THE COPOLYMER

FIELD OF THE INVENTION

The present invention relates to a copolymer, a cationic high molecular weight flocculating agent comprising the copolymer, and a process for producing the copolymer.

BACKGROUND OF THE INVENTION

Cationic polymers are used as flocculating agents, chemicals for papers, and the like. Of those, a cationic polymer having a high aqueous solution viscosity is used as a flocculating agent, especially as a flocculating agent for organic sludge.

A copolymer having a unit represented by the following formula (5) is obtained by contacting a copolymer having a unit represented by the following formula (6) with an acid as described in, for example, JP-B-42-9653 (The term "JP-B" as used herein means an "examined Japanese patent publication). However, Brookfield viscosity of the aqueous solution thereof is low and, therefore, when the copolymer is used as a cationic high molecular weight flocculating agent, the flocculating performance thereof is not sufficient.

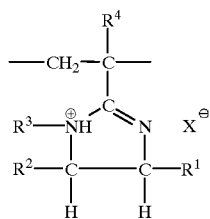

(5)

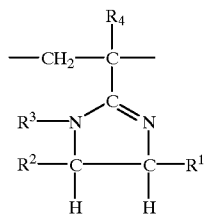

(6)

wherein $R^1$, $R^2$ and $R^3$ each independently represent a hydrogen atom, an aliphatic group, aralkyl group or aromatic group, each group of which may have a functional group; $R^4$ represents a hydrogen atom or methyl group; and X represents an anion.

It is known that the copolymer having the unit represented by the above-described formula (5) is obtained by a reaction of a copolymer containing (meth)acrylonitrile with a polyamine using sulfur as a catalyst. Such conventional methods include a method using an excess amount of a polyamine (as described in, for example, JP-B-42-6271 and 42-9653); a method wherein a copolymer containing (meth)acrylonitrile is dispersed in a non-solvent therefor to react as described in, for example, JP-B-42-6271, and JP-A-58-96604, 61-83205, 61-83206, 61-83207 and 62-34905 (The term "JP-A" as used herein means an "unexamined published Japanese patent application"); and a method wherein a reaction is conducted in a mixed state of a copolymer containing (meth)acrylonitrile and a polyamine-insoluble solid filler as described in, for example, JP-A-61-285202.

These methods, however, use sulfur as the catalyst, so that extremely toxic hydrogen sulfide is produced as a by-product during reaction. The generated hydrogen sulfide forms a salt with the product. Therefore, it was not easy to eliminate the hydrogen sulfide in the product.

The products obtained according to these methods had the problems that they formed a mass during the reaction or they became partially insoluble in water.

Conventionally, when the copolymer having the unit represented by the above-described formula (5) was used as a flocculating agent, the Brookfield viscosity of the aqueous solution thereof was low and, therefore, it was not sufficient as a flocculating agent. Further, the production method of the copolymer also had the problems that hydrogen sulfide was formed as a by-product, the product became a solid mass during the reaction, and the product became partially insoluble in water. Thus, the above-described copolymer was industrially insufficient.

Accordingly, a copolymer having the unit represented by the above-described formula (5) and also having a high Brookfield viscosity as an aqueous solution thereof as well as a method for producing the same have been desired to be developed. Thus, the object of the present invention is to provide a copolymer having the unit represented by the above-described general formula (5) and also having a high viscosity as an aqueous solution thereof, the cationic high-molecular flocculating agent comprising the same, and the process for producing the same.

SUMMARY OF THE INVENTION

As a result of extensive investigations with respect to the kinds of acid salts in the unit represented by the above-described formula (5) and also units constituting the copolymer other than the unit represented by the above-described formula (5) in order to overcome the above-described problems, a copolymer having a high aqueous solution viscosity and showing excellent flocculating performance as a cationic high molecular weight flocculating agent, and a method for producing the same have been found. The present invention has been completed based on those findings.

Accordingly, one object of the present invention is to provide a copolymer comprising a unit represented by the formula (1) described hereinafter and a unit represented by the formula (2) described hereinafter, and also having high viscosity as an aqueous solution thereof.

Another object of the present invention is to provide a cationic high molecular weight flocculating agent comprising the copolymer. This cationic high molecular weight flocculating agent has excellent filtration property, and excellent aggregation property which can decrease water content in dehydrated cake. Further, use of the agent can form flocks having a large size.

Still another object of the present invention is to provide a process for producing the copolymer. This production process has the advantages that hydrogen sulfide is not by-produced, the reaction product does not form a solid mass during reaction, and the reaction product completely dissolves in water.

According to one embodiment of the present invention, there is provided a copolymer comprising a unit represented by the following formula (1) and a unit represented by the following formula (2):

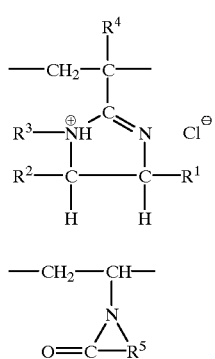

(1)

(2)

wherein $R^1$, $R^2$ and $R^3$ each independently represent a hydrogen atom, an aliphatic group, an aralkyl group or an aromatic group, each group of which may have a functional group; $R^4$ represents a hydrogen atom or methyl group; and $R^5$ represents an alkylene group having 2 to 5 carbon atoms; the copolymer having a Brookfield viscosity as a 1 wt % aqueous solution thereof of 10 to 10,000 centipoise at 25° C.

According to another embodiment of the present invention, there is provided a cationic high molecular weight flocculating agent comprising the copolymer.

According to still another embodiment of the present invention, there is provided a process for producing the copolymer comprising a unit represented by the above-described formula (1) and a unit represented by the above-described formula (2), the copolymer having a Brookfield viscosity of 1 wt % aqueous solution thereof of 10 to 10,000 centipoise at 25° C., which comprises reacting a copolymer comprising a unit represented by the above-described formula (2) and a unit represented by the following formula (3):

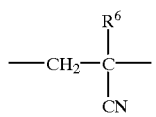

(3)

wherein $R^6$ represents a hydrogen atom or methyl group, with a polyamine in the presence of at least one of ammonium chloride and a hydrochloride of an amine.

BRIEF DESCRIPTION OF THE DRAWING

The FIGURE is an infrared absorption spectrum of the solid material obtained in Example 1.

DETAILED DESCRIPTION OF THE INVENTION

The present invention will be described in further detail below.

The copolymer of the present invention is a copolymer comprising a unit represented by the following formula (1) and a unit represented by the following formula (2), the copolymer having a Brookfield viscosity as 1 wt % aqueous solution thereof of 10 to 10,000 centipoise at 25° C.:

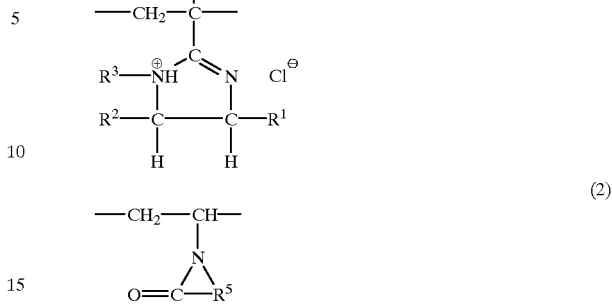

wherein $R^1$, $R^2$ and $R^3$ each independently represent a hydrogen atom, an aliphatic group, an aralkyl group or an aromatic group, each group of which may have a functional group; $R^4$ represents a hydrogen atom or methyl group; and $R^5$ represents an alkylene group having 2 to 5 carbon atoms.

The cationic high molecular weight flocculating agent of the present invention comprises a copolymer comprising the units represented by the above-describe formulae (1) and (2). This copolymer has a molar ratio of the unit represented by the formula (1)/the unit represented by the formula (2) in the range of 1/99 to 99/1, and preferably 30/70 to 95/5. In view of the flocculating performance, the molar ratio is particularly preferably in the range of 50/50 to 95/5. The copolymer has a Brookfield viscosity as a 1 wt % aqueous solution thereof of 10 to 10,000 centipoise at 25° C.

The cationic high molecular weight flocculating agent of the present invention may further contain other units in addition to the units represented by the above-describe formulae (1) and (2). Examples of the units generally contained include the units represented by the above-described formulae (3) and (6).

If the unit represented by the above-described formula (3) is contained in a large amount, water-solubility of the cationic high molecular weight flocculating agent decreases. Therefore, the content of the unit represented by the above-described formula (3) in the cationic high molecular weight flocculating agent of the present invention is generally 0 to 10 mol %, and preferably 0 to 5 mol %, to the copolymer comprising the units represented by the formulae (1) and (2). On the other hand, the content of the unit represented by the above-described formula (6) in the cationic high molecular weight flocculating agent of the present invention is generally 0 to 30 mol %, and preferably 0 to 10 mol %, to the copolymer comprising the units represented by the formulae (1) and (2).

The Brookfield viscosity of a 1 wt % aqueous solution of the cationic high molecular weight flocculating agent of the present invention at 25° C. is generally 10 to 10,000 centipoise. In view of flocculating performance and easy handling, the viscosity is preferably 50 to 5,000 centipoise. If the viscosity is less than 10 centipoise, the flocculating performance is insufficient, if on the other hand, it exceeds 10,000 centipoise, the aqueous solution becomes extremely viscous, so that handling becomes undesirably difficult.

The cationic high molecular weight flocculating agent of the present invention is used to flocculate substances suspended in waste water and remove the same from the waste water. Therefore, the cationic high molecular weight flocculating agent is especially effective for use in an organic sludge. The term "organic sludge" used herein means raw sludge, excess sludge, concentrated sludge or the mixed sludge thereof, generated in a sewage treatment plant; digested sludge in urine and feces; treatment; and sludge generated in the activated sludge treatment of industrial waste water other than sewage. The addition of the cationic high molecular weight flocculating agent of the present invention to those sludges can form flock. The flock thus formed is dehydrated by means of a dehydration unit such as a belt press, screw press, filter press or superdecanter to obtain a dehydrated cake.

The cationic high molecular weight flocculating agent of the present invention is added to a slurry containing sludge to be treated in an amount of generally 0.01 to 5.0% by weight, and preferably 0.1 to 1.2% by weight, based on the solid content concentration of the slurry. It is preferable that the pH of the slurry containing the sludge to be treated is generally 3.5 to 8.0.

The process for producing the copolymer of the present invention comprises reacting a copolymer comprising the units represented by the above-described formulae (2) and (3), respectively, with a polyamine in the presence of a catalyst.

The catalyst used in the process for producing the copolymer of the present invention is ammonium chloride and/or a hydrochloride of an amine. The amine is not particularly limited, and examples of the amine include aliphatic amines such as methylamine, dimethylamine, trimethylamine, ethylamine, diethylamine and triethylamine; alicyclic amines such as piperidine, pyrrolidine and cyclohexylamine; aromatic amines such as pyridine, aniline, dimethylaniline and diethylaniline; and polyamines such as ethylenediamine and ethylenetriamine. In the production process of the present invention, since a polyamine is used as the starting material, the polyamine can be converted to the hydrochloride by adding hydrogen chloride to the reaction system.

The copolymer comprising the units represented by the above-described formulae (2) and (3), which is the raw material used In the production process of the present invention, includes copolymers comprising (meth) acrylonitrile monomers and N-vinyllactam monomers. Examples of the N-vinyllactam monomer include N-vinyl pyrrolidone, N-vinyl-2-piperidone, N-vinyl-2-caprolactam, N-vinyl-3-methyl-2-caprol actarn, N-vinyl-3-methyl-2-piperidone, N-vinyl-4-methyl-2-piperidone, N-vinyl-4-methyl-2-caprolactam, N-vinyl-3-ethyl-2-pyrrolidone and N-vinyl-4,5-dimethyl-2-pyrrolidone. A preferred copolymer comprising (meth)acrylonitrile monomer and N-vinyllactam monomer is a copolymer comprising acrylonitrile and N-vinyl pyrrolidone.

The copolymer comprising the units represented by the above-described formulae (2) and (3), which is the raw material used in the production process of the present invention, can be obtained by a conventional method using (meth)acrylonitrile monomer and N-vinyllactam monomer. A representative copolymerization method is a conventional radical polymerization method. The copolymerization method further includes a slurry polymerization method using a water-soluble redox polymerization initiator in an aqueous medium, a solution polymerization method using a solvent such as dimethyl sulfoxide, N,N-dimethylformamide or N,N-dimethylacetamide, a suspension polymerization method and an emulsion polymerization method.

The copolymer comprising the units represented by the above-described formulae (2) and (3), which is the raw material used in the production process of the present invention, has an average molecular weight of generally 50,000 to 5,000,000, and preferably 100,000 to 3,000,000.

The starting polyamine used in the production process of the copolymer of the present invention includes 1,2-diamines represented by the following formula (4):

$$H_2NCHR^7CHR^8NHR^9 \qquad (4)$$

wherein $R^7$, $R^8$ and $R^9$ each independently represent hydrogen atom, an aliphatic group, an aralkyl group or an aromatic group, each group of which may have a functional group.

The 1,2-diamine is not particularly limited, and examples thereof include ethyleneamines (such as ethylenediamine, diethylenetriamine, triethyl enetetramine, tetraethyl enepentamine, pentaethylenehexamine and aminoethylpiperazine), diaminopropane, diaminobutane, diaminopentane, diaminohexane, diaminooctane, diaminononane, diaminodecane, cyclohexyl ethylenediamine, benzyl ethylenediamine, phenyl ethylenediamine, methoxyphenyl ethylenediamine, dimethylphenyl ethylenediamine, tolyl ethylenediamine, N-cyclohexyl ethylenediamine, N-benzyl ethylenediamine, N-phenyl ethylenediamine, N-methoxyphenyl ethylenediamine, N-dimethylphenyl ethylenediamine, N-tolyl ethylenediamine, N-methyl sthylenediamine, N-ethyl ethylenediamine, N-isobutyl ethylenediamine, N-phenyl ethylenediamine and N-(2-aminoethyl) ethylenediamine.

In the production process of the present invention, the copolymer comprising the units represented by the above-described formulae (2) and (3) can be reacted with the polyamine such that the amount of the unit represented by the formula (3) in the copolymer is a chemically equivalent amount to the amount of the polyamine or either of them can be present in excess.

In the production process of the present invention, the reaction is conducted at a temperature of generally 60 to 200° C., and preferably 70 to 180° C. Although the reaction can be conducted at a temperature high than 200° C., the starting copolymer sometimes may thermally decompose. On the other hand, if the reaction temperature is lower than 60° C., the reaction rate becomes extremely low, which uneconomically results in the necessity to increase the amount of a catalyst used.

The production process of the present invention is generally conducted in the liquid phase. In the production process of the present invention, the reaction can be conducted at normal pressure or under pressure so long as the starting material can be maintained in a liquid state, a solution state or a suspension state. In this reaction, ammonia is generated during the reaction, which results in elevation of the pressure when the reaction is under pressure. However, the generated ammonia can be removed in the course of the reaction or after completion of the reaction. Where the reaction temperature exceeds the boiling point of the starting materials, the following methods can be employed: the reaction is conducted under pressure, a condenser is provided or a starting material is added in small portions.

The production process of the present invention may use or may not use a solvent. If used, a solvent which decomposes to yield a product, such as water, is not preferable. However, any solvents can be used without particular limitations so long as they are inert under reaction conditions.

The production process of the present invention can be conducted in a continuous manner, a batchwise manner or a semi-batchwise manner. Further, the reaction can be conducted in a fixed bed or a suspended bed.

If the unit represented by the above-described formula (6) is contained in the copolymer to be obtained according to the production process of the present invention, the unit can readily be converted to the unit represented by the above-described formula (1) by contacting with hydrogen chloride.

The copolymer obtained according to the production process of the present invention can be purified as it is or can be purified after contacting with hydrochloric acid.

The present invention will be described in more detail by referring to the following Examples, but the invention should not be limited thereto.

Copolymers obtained in Raw Material production Examples, Examples and Comparative Examples were measured for infrared absorption spectrum, Brookfield viscosity, and composition analysis according to the following methods.

Infrared Absorption Spectrum:

Infrared absorption spectrum was measured according to the KBr method using a Shimadzu Fourier transform infrared spectrophotometer (FTIR-8100 M). Brookfield Viscosity:

An aqueous solution of a copolymer was prepared and the viscosity thereof was measured using a B-type rotating viscometer (BL model) according to JIS K 7117 (edited in 1997).

Compositional Analysis of Copolymer:

Content of the monomers represented by the above-described formulae (2) and (3) in the copolymer was analyzed according to the infrared absorption spectrum analysis method described in "Teiryobunseki no jikken to keisan" (vol.3, Kikibunseki Jikkenhou, Seiji Takagi, published by Kyoritsu Shuppan K.K.). That is, according to the Kbr method using a Shimadzu Fourir transform infrared spectrophotometer (FTIR-8100 M), a calibration curve using a polyacrylonitrile homopolymer and poly(N-vinylpyrrolidone) homopolymer as standard substances was prepared, and the composition wets calculated using this calibration curve. The content of the unit represented by the above-described formula (1) in the copolymer was calculated from the chlorine content obtained according to ion chromatography of the copolymer. Regarding the content of the unit represented by the above-described formula (5), sulfate was calculated from the sulfur content in the copolymer, phosphate was calculated from the phosphorus content in the copolymer, and acetate and formate were calculated from the ratio of carbon (%)/nitrogen (%) according to the elemental analysis of the copolymer.

Generation of Hydrogen Sulfide:

In the Examples and Comparative Examples, odor from the flask at completion of the reaction was judged by the sense of smell of a person. The results obtained are shown in the Table below.

O: No generation of irritative odor

X: Generation of irritative odor

Water-solubility of Hydrogen sulfide:

5 g of a solid material obtained in each of the Examples and Comparative Examples was added to 495 g of water, and after stirring the resulting mixture for 3 hours, the state of the aqueous solution was visually evaluated. the state that the solid material was completely dissolved in water was evaluated as "completely dissolved", the state that the solution does not have flowability was evaluated as "agar state", the state that the solution partially contained insoluble matter was evaluated as "partially insoluble". The results obtained are shown in the Table below.

PRODUCTION EXAMPLE 1 OF RAW MATERIAL 14.3 g of N-vinylpyrrolidone, 38.7 g of acrylonitrile and 300 g of ion-exchanged water flushed with nitrogen were charged into a 500 ml four-necked flask equipped with a stirrer and a nitrogen gas inlet. The resulting mixture was cooled to 50° C. with stirring under a nitrogen stream. Nitrogen flushing was conducted for a further one hour, and 0.121 g of potassium persulfate and 0.012 g of sodium hydrosulfite were added thereto. The resulting mixture was maintained at 5° C. for 6 hours to obtain a deposited copolymer. The deposited copolymer was separated by filtration, and the resulting product was washed with ion-exchanged water and methyl alcohol several times, followed by drying under reduced pressure, thereby obtaining an N-vinylpyrrolidone-acrylonitrile copolymer. The content of the unit represented by the above-described formula (2) of the resulting copolymer was 26 mol %, and the content of the unit represented by the above-described formula (3) was 74 mol %.

PRODUCTION EXAMPLE 2 OF RAW MATERIAL

Reaction was conducted in the same manner as in Production Example 1 above except for using 17.6 g of N-vinylpyrrolidone, 15.8 g of acrylonitrile, 0.08 g of potassium persulfate and 0.01 g of sodium hydrosulfite to obtain an N-vinylpyrrolidone-acrylonitrile copolymer. The content of the unit represented by the above-described formula (2) of the resulting copolymer was 43 mol %, and the content of the unit represented by the above-described formula (3) was 57 mol %.

EXAMPLE 1

10 g of the N-vinylpyrrolidone-acrylonitrile copolymer obtained in Production Example 1, 100 g of ethylenediamine, 12 g of ammonium chloride and 80 g of 1-butanol were charged into a flask. After nitrogen flushing in the flask, the temperature was elevated. The flask was heated at 92° C. for 9 hours, and then cooled to obtain a viscous reaction mixture. The viscous reaction mixture was taken out of the flask and poured into acetone to obtain a white solid. The white solid thus obtained was dried to obtain 22.3 9 of a solid material. The infrared absorption spectrum the solid material is shown in FIG. 1. The solid material obtained was a copolymer having a content of the unit represented by the above-described formula (1) of 74 rnol% and a content of the unit represented by the above-described formula (2) of 26 mol %. The Brookfield viscosity of a 1 wt % aqueous solution of the solid material at 25° C. was 531 centipoise.

EXAMPLE 2

10 g of the N-vinylpyrrolidone-acrylonitrile copolymer obtained in Production Example 1, 90 g of ethylenediamine, 12 g of ammonium chloride and 80 g of 1-propanol were charged into a flask. After nitrogen flushing in the flask, the temperature was elevated. The flask was heated at 90° C. for 10 hours, and then cooled to obtain a viscous reaction mixture. The solid material obtained was a copolymer having a content of the unit represented by the above-described formula (1) of 74 mol % and a content of the unit represented by the above-described formula (2) of 26 mol %. The viscous reaction mixture was taken out of the flask and poured into acetone to obtain a white solid. The white solid thus obtained was dried to obtain 21.5 g of a solid material. The Brookfield viscosity of a 1 wt % aqueous solution of the resulting solid material at 25° C. was 515 centipoise.

EXAMPLE 3

Reaction was conducted in the same manner as in Example 1 except that 22 g of ethylenediamine hydrochloride was used instead of ammonium chloride to obtain a solid material. The material was dried to obtain 21.7 g of a solid material. The solid material obtained was a copolymer having a content of the unit represented by the above-described formula (1) of 74 mol % and a content of the unit represented by the above-described formula (2) of 26 mol %. The Brookfield viscosity of a 1 wt % aqueous solution of the resulting solid material at 25° C. was 523 centipoise.

EXAMPLE 4

Reaction was conducted in the same manner as in Example 1 except that 120 g of 1,2-propanediamine was used instead of ethylenediamine to obtain a solid material. This material was dried to obtain 24.9 g of a solid material. The solid material obtained was a copolymer having a content of the unit represented by the above-described formula (1) of 74 mol % and a content of the unit represented by the above-described formula (2) of 26 mol %. The Brookfield viscosity of a 1 wt % aqueous solution of the resulting solid material at 25° C. was 498 centipoise.

EXAMPLE 5

Reaction was conducted in the same manner as in Example 3 except that 80 g of n-heptane was used instead of 1-butanol to obtain a solid material. This material was dried to obtain 22.9 g of a solid material. The solid material obtained was a copolymer having a content of the unit represented by the above-described formula (1) of 74 mol % and a content of the unit represented by the above-described formula (2) of 26 mol %. The Brookfield viscosity of a 1 wt % aqueous solution of the resulting solid material at 50° C. was 490 centipoise.

EXAMPLE 6

Reaction was conducted in the same manner as in Example 1 except for using 10 g of the N-vinylpyrrolidone-acrylonitrile copolymer obtained in Production Example 2 to obtain a solid material. This material was dried to obtain 21.4 g of a solid material. The solid material obtained was a copolymer having a content of the unit represented by the above-described formula (1) of 57 mol % and a content of the unit represented by the above-described formula (2) of 43 mol %. The Brookfield viscosity of 1 wt % aqueous solution of a the resulting solid material at 25° C. was 95 centipoise.

COMPARATIVE EXAMPLE 1

10 g of the N-vinylpyrrolidone-acrylonitrile copolymer obtained in Production Example 1, 120 g of ethylenediamine and 0.5 g of sulfur powder were charged into a flask. After nitrogen flushing in the flask, the temperature was elevated. The flask was heated at 115° C. for 9 hours, and then cooled to obtain a viscous reaction mixture. The viscous reaction mixture was taken out of the flask and poured into acetone to obtain a solid. The solid thus obtained was dried to obtain a solid material. 100 g of ion-exchanged water containing 43 g of a 10 wt % aqueous hydrochloric acid solution was added to 10 g of the solid material, followed stirring. The resulting mixture was poured into acetone to obtain a solid. The solid obtained was washed with acetone and then dried under reduced pressure to obtain 14.1 g of a solid material. The solid material obtained was a hydrochloride-type copolymer having the content of the unit represented by the above-described formula (1) of 74 mol %. The Brookfield viscosity of a 1 wt % aqueous solution of the resulting copolymer at 25° C. was 8.4 centipoise.

COMPARATIVE EXAMPLE 2

10 g of the N-vinylpyrrolidone-acrylonitrile copolymer obtained in Production Example 1, 100 g of ethylenediamine, 80 g of n-heptane and 0.3 g of sulfur powder were charged into a flask. After nitrogen flushing in the flask, the temperature was elevated. The flask was heated at 80° C. for 6 hours, and then cooled. The resulting mixture was poured into acetore to obtain a solid. The solid thus obtained was dried to obtain a solid material. 100 g of ion-exchanged water containing 43 g of a 10 wt % aqueous hydrochloric acid solution was added to 10 g of the solid material obtained above, followed by stirring. The resulting mixture was poured into acetone to obtain a solid. The solid obtained was washed with acetone and then dried under reduced pressure to obtain 13.2 g of a solid material. The resulting copolymer was partially insoluble in water and, therefore, it was impossible to measure the viscosity of an aqueous solution thereof.

COMPARATIVE EXAMPLE 3

Reaction was conducted in the same manner as in Comparative Example 1 except that 120 g of a 10 wt % aqueous sulfuric acid solution was used in place of 43 g of 10 wt % aqueous hydrochloric acid solution. The solid obtained was washed with acetone and then dried under reduced pressure to obtain 20.6 g of a solid material. The solid material obtained was a sulfate-type copolymer having the content of the unit represented by the above-described formula (5) of 74 mol %. The Brookfield viscosity of a 1 wt % aqueous solution of the resulting copolymer at 25° C. was 6.4 centipoise.

COMPARATIVE EXAMPLE 4

Reaction was conducted in the same manner as in Comparative Example 1 except that 120 g of 10 wt % aqueous phosphoric acid solution was used in place of 43 g of 10 wt % aqueous hydrochloric acid solution. The solid obtained was washed with acetone and then dried under reduced pressure to obtain 20.6 g of a solid material. The solid material obtained was a phosphate-type copolymer having the content of the unit represented by the above-described formula (5) of 74 mol %. The Brookfield viscosity of a 1 wt % aqueous solution of the resulting copolymer at 25° C. was 4.3 centipoise.

COMPARATIVE EXAMPLE 5

Reaction was conducted in the same manner as in Comparative Example 1 except that 50 g of a 10 wt % aqueous acetic acid solution was used in place of 43 g of the 10 wt % aqueous hydrochloric acid solution. The solid obtained was washed with acetone and then dried under reduced pressure to obtain 14.9 g of a solid material. The solid material obtained was an acetate-type copolymer having a content of the unit represented by the above-described formula (5) of 74 mol %. The Brookfield viscosity of a 1 wt % aqueous solution of the resulting copolymer at 25° C. was 9.0 centipoise.

COMPARATIVE EXAMPLE 6

10 g of a polyacrylonitrile homopolymer (molecular weight: 1,620,000), 120 g of ethylenediamine and 0.5 g of sulfur powder were charged into a flask. After nitrogen flushing in the flask, the temperature was elevated. The flask was heated at 115° C. for 9 hours. During the reaction, a rapid viscosity increase was confirmed. After completion of the reaction, the resulting polymer became a solid mass. Therefore, the resulting product was taken out of the flask by breaking the flask. This reaction product was washed with acetone and then finely ground to obtain 29.5 g (dry weight) of a solid material. 100 g of ion-exchanged water containing 43 g of 10 wt % aqueous hydrochloric acid solution was added to the solid material, followed by stirring. The resulting mixture was poured into acetone to obtain a solid. The solid obtained was washed with acetone and then dried under reduced pressure to obtain 13.1 g of a solid material. An attempt was made to prepare a 1 wt % aqueous solution of the resulting solid material, but only an agar-like solution having no flowability was obtained, and thus a complete aqueous solution could not be obtained. The Brookfield viscosity of a 1 wt % aqueous solution of this agar-like liquid at 25° C. was 1,600 centipoise.

COMPARATIVE EXAMPLE 7

Reaction was conducted in the same manner as in Comparative Example 1 except that an acrylonitrile-styrene copolymer (molecular weight: 600,000, acrylonitrile content: 25 mol %) was used in place of the N-vinylpyrrolidone-acrylonitrile copolymer obtained in Production Example 1. The solid obtained was washed with acetone and then dried under reduced pressure to obtain 10.9 g of a solid material. The solid material obtained was a sulfate-type copolymer having a content of the unit represented by the above-described formula (5) of 74 mol %. The Brookfield viscosity of a 1 wt % aqueous solution of the resulting copolymer at 25° C. was 8.5 ceritipoise.

COMPARATIVE EXAMPLE 8

10.6 g of the N-vinylpyrrolidone-acrylonitrile copolymer obtained in Production Example 1, 120 g of ethylenediamine, 0.32 g of sulfur powder and 212 ml of o-dichlorobenzene were charged into a flask. After nitrogen flushing in the flask, the temperature was elevated. The flask was heated at 90° C. for 9 hours, and then cooled. The resulting mixture was poured into acetone to obtain a solid. The solid thus obtained was dried to obtain 10 g of a solid material. 100 g of ion-exchanged water containing 43 g of a 10 wt % aqueous hydrochloric acid solution was added to 10 g of the solid material, followed by stirring. The resulting mixture was poured into acetone to obtain a solid. The solid obtained was washed with acetone and then dried under reduced pressure to obtain 13.7 g of a solid material. The Brookfield viscosity of a 1 wt % aqueous solution of the resulting copolymer at 25° C. was 5.5 centipoise.

Polymers obtained in Examples 1 to 6, and Comparative Examples 1 to 8 were evaluated for flocculating performance by the following method. The results obtained are shown in the Table below.

Evaluation of Flocculating Performance:

300 ml of a mixed raw sludge from a sewage treatment plant (solid concentration: 1.5 wt %, pH: 6.8) was taken in a 500 ml glass beaker, and 12 ml of a 0.3 wt % aqueous solution of each of the respective copolymers obtained in Examples 1 to 6, and Comparative Examples 1 to 8 was added thereto. The resulting mixture was stirred at a number of revolutions of 200 rpm for 30 seconds with a jar tester to cause flocculation, and the flock diameter was then visually measured. The flocculated sludge was subjected to natural filtration through a polyester filter fabric (herringbone weave) for 60 seconds, and the amount of filtrate was measured. The flocculated sludge was sandwiched with two sheets of the same polyester fabric, and was subjected to dehydration with a belt press machine (filter fabric: herringbone weave, fabric tensile force: 5.23 kg/cm, high-pressure belt tensile force: 2.25 kg/cm). The resulting dehydrated cake was dried at 105° C. under reduced pressure for 12 hours. The water content of the dehydrated cake was calculated from the weight loss of the raw sludge before and after drying.

TABLE

| | Sample Properties | |
|---|---|---|
| Sample | Irritative odor by hydrogen sulfide | Water-solubility |
| Example 1 | O | Completely dissolved |
| Example 2 | O | Completely dissolved |
| Example 3 | O | Completely dissolved |
| Example 4 | O | Completely dissolved |
| Example 5 | O | Completely dissolved |
| Example 6 | O | Completely dissolved |
| Comparative Example 1 | X | Completely dissolved |
| Comparative Example 2 | X | Partially insoluble |
| Comparative Example 3 | X | Completely dissolved |
| Comparative Example 4 | X | Completely dissolved |
| Comparative Example 5 | X | Completely dissolved |
| Comparative Example 6 | X | Agar state |
| Comparative Example 7 | X | Completely dissolved |
| Comparative Example 8 | X | Completely dissolved |

| | Aggregation Properties | | |
|---|---|---|---|
| Sample | Flock diameter(*) (mm) | Amount of filtrate after 60 seconds (ml) | Water content of dehydrated cake (%) |
| Example 1 | 16 | 225 | 78.2 |
| Example 2 | 14 | 230 | 77.9 |
| Example 3 | 16 | 221 | 78.9 |
| Example 4 | 12 | 219 | 78.4 |
| Example 5 | 16 | 231 | 77.7 |
| Example 6 | 12 | 235 | 78.8 |
| Comparative Example 1 | 1 | 55 | Dehydration impossible |
| Comparative Example 2 | — | — | — |
| Comparative Example 3 | 1 | 41 | Dehydration impossible |
| Comparative Example 4 | 1 | 21 | Dehydration impossible |
| Comparative Example 5 | 1 | 73 | Dehydration impossible |
| Comparative Example 6 | 5 | 209 | 82.1 |
| Comparative Example 7 | 1 | 60 | Dehydration impossible |
| Comparative Example 8 | 1 | 48 | Dehydration impossible |

(*)Visually measured after stirring with a jar tester

As described above, according to the present invention, a copolymer capable of providing an aqueous solution therefor having high viscosity can be obtained. Further, use of a cationic high molecular weight flocculating agent comprising such a copolymer can form a bulky flock, achieve a desirable solid-liquid separation, and decrease water content of sludge, in sludge treatment.

While the invention has been described in detail and with reference to specific embodiments thereof, it will be apparent to one skilled in the art that various changes and modifications can be made therein without departing from the spirit and scope thereof.

What is claimed is:

1. A copolymer comprising 50 to 95 mol % of a unit represented by the following formula (1) and 50 to 5 mol % of a unit represented by the following formula (2):

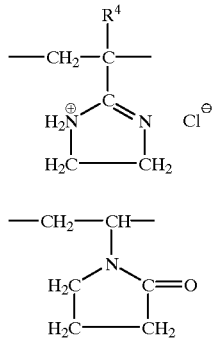

(1)

(2)

wherein $R^1$ represents a hydrogen atom or methyl group.

2. A cationic high molecular weight flocculating agent comprising the copolymer as claimed in claim 1.

3. A process for treating sludge, which comprises adding a cationic high molecular weight flocculating agent comprising the copolymer as claimed in claim 1 to sludge.

4. A process for producing a copolymer comprising a unit represented by the following formula (3) and a unit represented by the following formula (4):

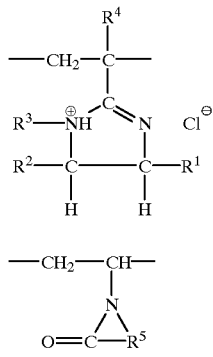

(1)

(2)

wherein $R^1$, $R^2$ and $R^3$ each independently represent a hydrogen atom, an aliphatic group, an aralkyl group or an aromatic group, each group of which may have a functional group; $R^4$ represents a hydrogen atom or methyl group; and $R^5$ represents an alkylene group having 2 to 5 carbon atoms;

the copolymer having a Brookfield viscosity as a 1 wt % aqueous solution thereof of 10 to 10,000 centipoise at 25° C., which process comprises reacting a copolymer comprising a unit represented by the following formula (4) and a unit represented by the following formula (5):

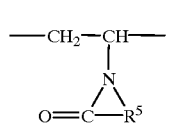

(2)

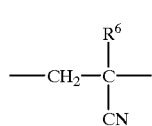

(3)

wherein $R^5$ represents an alkylene group having 2 to 5 carbon atoms, and $R^6$ represents a hydrogen atom or methyl group, with a polyamine in the presence of ammonium chloride and/or a hydrochloride of an amine, wherein said polyamine is a compound represented by the following formula (6):

$$H_2NCHR^7CHR^8NHR^9 \qquad (6)$$

wherein $R^7$, $R^8$ and $R^9$ each independently represent a hydrogen atom, an aliphatic group, an aralkyl group or an aromatic group, each group of which may have a functional group.

5. The process as claimed in claim 4, wherein said polyamine is 1,2-diamine.

6. The process as claimed in claim 4, wherein the reaction is conducted at a temperature of 60 to 200° C.

7. The process as claimed in claim 4, wherein the reaction is conducted in a liquid phase.

8. The process as claimed in claim 6, where in the reaction is conducted in a liquid phase.

9. The process as claimed in claim 5, wherein the reaction is conducted at a temperature of 60 to 200° C.

10. The process as claimed in claim 5, wherein the reaction is conducted in a liquid phase.

11. The process as claimed in claim 6, wherein the reaction is conducted in a liquid phase.

* * * * *

UNITED STATES PATENT AND TRADEMARK OFFICE
CERTIFICATE OF CORRECTION

PATENT NO. : 6,294,615 B1
DATED : September 25, 2001
INVENTOR(S) : Higashino, Toshiya and Inoue, Hiroshi It is certified that error appears in the above-identified patent and that said Letters Patent is hereby corrected as shown below:

<u>Title page,</u>
Item [73], Assignee, delete "Tosch Corporation, Yamaguchi (JP)" and replace with -- Tosoh Corporation, Yamaguchi (JP) --

Signed and Sealed this

Thirteenth Day of January, 2004

JON W. DUDAS
*Acting Director of the United States Patent and Trademark Office*